(12) United States Patent
Dufresne et al.

(10) Patent No.: US 10,737,939 B2
(45) Date of Patent: Aug. 11, 2020

(54) PROCESS FOR PRODUCING HYDROGEN SULFIDE IN A CIRCULATING CATALYTIC BED REACTOR

(71) Applicant: EURECAT S.A., La Voulte-sur-Rhone (FR)

(72) Inventors: Pierre Dufresne, Aouste sur Sye (FR); Pauline Galliou, Saint Laurent du Pape (FR); Giuseppe Italiano, Valence (FR); Ezio Antonino Viglianti, Aci Bonaccorsi (IT); Franck Labruyere, Charmes sur Rhone (FR)

(73) Assignee: EURECAT S.A., La Voulte-sur-Rhone (FR)

( * ) Notice: Subject to any disclaimer, the term of this patent is extended or adjusted under 35 U.S.C. 154(b) by 91 days.

(21) Appl. No.: 15/963,088

(22) Filed: Apr. 25, 2018

(65) Prior Publication Data
US 2018/0312402 A1 Nov. 1, 2018

(30) Foreign Application Priority Data
Apr. 28, 2017 (FR) ...................................... 17 53738

(51) Int. Cl.
*C01B 17/16* (2006.01)
*B01J 37/20* (2006.01)
(Continued)

(52) U.S. Cl.
CPC ............. *C01B 17/162* (2013.01); *B01J 23/30* (2013.01); *B01J 23/755* (2013.01); *B01J 23/882* (2013.01);
(Continued)

(58) Field of Classification Search
None
See application file for complete search history.

(56) References Cited

U.S. PATENT DOCUMENTS

| 2,214,859 A | 9/1940 | Maude et al. |
| 3,519,556 A * | 7/1970 | Schutt ...................... B01J 23/70 |
| | | 208/111.3 |

(Continued)

FOREIGN PATENT DOCUMENTS

| EP | 0 359 356 A1 | 3/1990 |
| EP | 0 612 561 A1 | 8/1994 |

(Continued)

*Primary Examiner* — Sheng H Davis
(74) *Attorney, Agent, or Firm* — Hahn Loeser & Parks LLP; Bret A. Hrivnak

(57) ABSTRACT

A process for producing hydrogen sulfide from hydrogen and elemental sulfur, comprising:
bringing the sulfur into contact with a solid catalyst comprising at least one metal, chosen from metals from groups VIB and VIII of the Periodic Table of the Elements, in metal sulfide form, at a temperature ranging from 120° C. to 160° C.;
circulating the mixture of sulfur and catalyst resulting from step (a) in a reaction zone, in which said mixture is brought into contact with hydrogen, the reaction zone having a temperature at the inlet point of the catalyst of greater than or equal to 150° C. and a temperature at the outlet point of the catalyst of less than or equal to 300° C., and a pressure of less than or equal to 3 bar;
separating the catalyst and the gaseous effluents containing hydrogen sulfide; and
recycling the catalyst to the step of bringing.

16 Claims, 2 Drawing Sheets

(51) Int. Cl.
*B01J 23/882* (2006.01)
*B01J 23/30* (2006.01)
*B01J 35/08* (2006.01)
*B01J 35/10* (2006.01)
*B01J 27/051* (2006.01)
*B01J 23/755* (2006.01)
*B01J 23/883* (2006.01)
*B01J 35/02* (2006.01)
*B01J 27/049* (2006.01)

(52) U.S. Cl.
CPC ........... *B01J 23/883* (2013.01); *B01J 27/049* (2013.01); *B01J 27/051* (2013.01); *B01J 27/0515* (2013.01); *B01J 35/026* (2013.01); *B01J 35/08* (2013.01); *B01J 35/1019* (2013.01); *B01J 35/1038* (2013.01); *B01J 35/1042* (2013.01); *B01J 37/20* (2013.01)

(56) References Cited

U.S. PATENT DOCUMENTS

| | | | |
|---|---|---|---|
| 4,943,547 A | 7/1990 | Seamans et al. | |
| 5,508,243 A | 4/1996 | Mitzkat et al. | |
| 5,592,748 A | 1/1997 | Mitzkat et al. | |
| 6,100,216 A * | 8/2000 | Dufresne | C10G 45/08 502/216 |
| 2005/0159296 A1* | 7/2005 | Ginestra | B01J 23/94 502/30 |
| 2006/0060500 A1* | 3/2006 | Guillaume | B01J 37/20 208/108 |
| 2008/0312076 A1* | 12/2008 | Dufresne | B01J 8/16 502/220 |
| 2015/0190775 A1 | 7/2015 | Finkeldei et al. | |

FOREIGN PATENT DOCUMENTS

| | | |
|---|---|---|
| EP | 0 785 022 A1 | 7/1997 |
| EP | 2 676 926 A1 | 12/2013 |

\* cited by examiner

PROCESS FOR PRODUCING HYDROGEN SULFIDE IN A CIRCULATING CATALYTIC BED REACTOR

CROSS-REFERENCE TO RELATED APPLICATIONS

This application claims priority to, and the benefit of, French application no. 1753738, filed Apr. 28, 2017 with the Institut National de la Propriété Industrielle (French patent office), which is hereby incorporated by reference.

BACKGROUND

The subject of the present invention is the preparation of hydrogen sulfide from elemental sulfur and hydrogen, by a continuous process using a catalyst in a moving bed (or circulating bed).

Hydrogen sulfide ($H_2S$) is a chemical intermediate used in many industrial processes, for example for the preparation of organosulfur compounds, or in sulfurizing treatment such as (and non-limitingly) for sulfurizing catalysts that are used in hydrotreating reactions in the refining and petrochemical fields.

Hydrogen sulfide may be prepared in a manner known per se, by reacting elemental sulfur in liquid or gaseous form, and hydrogen, optionally in the presence of a catalyst based on hydrogenating metals. Industrial processes are often carried out at high temperatures, especially as the reaction is known to be highly exothermic.

In order to obtain a satisfactory yield of hydrogen sulfide, it is often necessary to perform the reaction at high pressure and/or to use a stoichiometric excess of sulfur.

The applicant has now developed an innovative process for producing hydrogen sulfide from hydrogen and sulfur, which makes it possible to resolve certain drawbacks of the prior art processes.

SUMMARY

The process according to the present invention is characterized in that it comprises the following steps:

(a) bringing the sulfur into contact with a solid catalyst comprising at least one metal, chosen from metals from groups VIB and VIII of the Periodic Table of the Elements, in metal sulfide form, at a temperature ranging from 120° C. to 160° C.;

(b) circulating the mixture of sulfur and catalyst resulting from step (a) in a reaction zone, in which said mixture is brought into contact with hydrogen, the reaction zone having a temperature at the inlet point of the catalyst of greater than or equal to 150° C. and a temperature at the outlet point of the catalyst of less than or equal to 300° C., and a pressure of less than or equal to 3 bar ($3\times10^5$ Pa);

(c) separating the catalyst and the gaseous effluents containing hydrogen sulfide; and (d) recycling the catalyst to step (a).

The process according to the invention is thus characterized in that the catalyst circulates in a loop between a zone (A) for coming into contact with sulfur and a reaction zone (B) in which the conversion of the sulfur and hydrogen into hydrogen sulfide is performed.

The process according to the invention makes it possible to prepare hydrogen sulfide with high yields, under controlled temperature and pressure conditions, lower than those generally used in the prior art.

In particular, it enables a good control of the temperature during the reaction for converting sulfur into hydrogen sulfide, and also a good use of the heat generated during the reaction in order to control the temperature of the catalyst in the zone for bringing the sulfur into contact with the catalyst.

Furthermore, unlike certain prior art processes, it does not necessitate using a stoichiometric excess of sulfur. It enables a complete conversion of the sulfur, without it being necessary to perform a second catalytic step.

Since the conversion of the sulfur is complete, the gaseous effluents at the outlet of the reactor do not contain sulfur. They contain no or few polysulfane compounds (i.e. compounds of $H_2S_n$ type with n being a number ranging from 2 to 8).

In the process of the invention, the gaseous effluents at the outlet of the reactor (step (c) above) contain hydrogen sulfide at a content of at least 30% by volume, preferably at least 50% by volume, more preferentially at least 75% by volume, and better still at least 90% by volume. Expressed by weight, the hydrogen sulfide content of said gaseous effluents is advantageously at least 88% by weight.

It should be noted that the gaseous effluents at the outlet of the reactor (step (c) above) contain no or very little water. Thus, the water content of said gaseous effluents is typically less than or equal to 3% by volume, or less than or equal to 1.5% by weight.

Specifically, there is no formation of water during the implementation of steps (a) and (b) of the process of the invention, and the water optionally present in the gaseous effluents may originate, inter alia, from the moisture present in the reactants (especially in the sulfur) and from the ambient moisture.

BRIEF DESCRIPTION OF THE DRAWINGS

The invention will be described in greater detail below, with reference to the appended figures.

DETAILED DESCRIPTION OF PARTICULAR EMBODIMENTS

Figure 1:
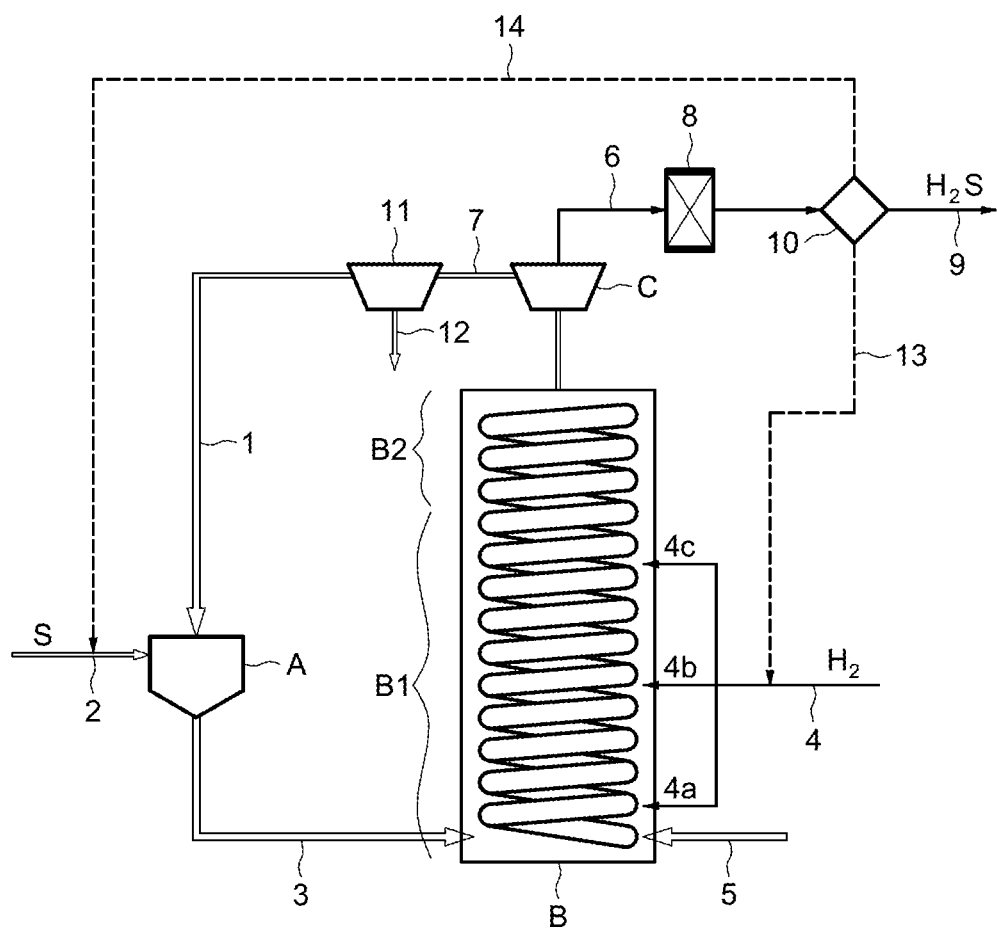
FIG. 1 illustrates a hydrogen sulfide production unit in accordance with the process of the invention, operating with a co-current circulation of catalyst and hydrogen.

The present invention makes it possible to prepare hydrogen sulfide from elemental sulfur ($S_x$) and hydrogen ($H_2$), according to a reaction known per se, which is the following:

$$S_x+xH_2 \text{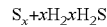} xH_2S$$

with x being an integer ranging from 6 to 20.

Preferably, the elemental sulfur has the formula S8.

The process according to the present invention uses a solid catalyst that comprises at least one metal chosen from metals from groups VIB and VIII of the Periodic Table of the Elements.

Preferably, the catalyst comprises at least one metal chosen from cobalt, nickel, iron, platinum, palladium, molybdenum, tungsten, and chromium.

According to one more preferred embodiment, it comprises at least one metal from group VIII chosen from cobalt and nickel, and at least one metal from group VIB chosen from molybdenum and tungsten. Even more preferably, it comprises one of the following metal combinations: CoMo, NiMo, NiW, NiCoMo.

In order to be active, the catalyst is used in the activated state, that is to say that the metal species present at the surface are present in the form of metal sulfides. The content of sulfides of a metal or metals from groups VIB and VIII generally represents from 10% to 80% by weight, relative to the total weight of the catalyst.

The catalyst may or may not be supported.

When it is not supported, the catalyst essentially contains metals from groups VIB and VIII of the Periodic Table of the Elements, which are sulfided at least on the surface of the catalyst.

According to one preferred embodiment, the catalyst used is supported, that is to say that the sulfides of the metal or metals from groups VIB and VIII of the Periodic Table of the Elements are present on a support based on one or more refractory mineral oxides. The refractory mineral oxides constituting the support may in particular be chosen from aluminas, silicas, silica-aluminas, zeolites, zirconias, oxides of titanium, calcium or magnesium, and mixtures of such oxides.

In the case of a supported catalyst, its content of sulfide(s) of a metal or metals from groups VIB and VIII is generally between 10% and 30% by weight relative to the total weight of the catalyst.

Preferably, the catalyst is present in the form of porous particles of small size such as for example beads, particles that are more or less cylindrical, extrudates. It has a specific surface area, measured by the BET method, generally of between 100 and 300 m$^2$/g, a pore volume, determined by nitrogen adsorption, ranging from 0.25 to 1 ml/g.

The first step of the process of the invention consists in bringing the sulfur into contact with the catalyst, at a temperature ranging from 120° C. to 160° C.

This step is advantageously carried out by circulating the hot catalyst resulting from the reaction zone in a contacting zone (A) in which the elemental sulfur is introduced in the solid state.

Typically, the sulfur and the catalyst are brought into contact directly in the catalyst recirculation line.

It is also possible to optionally use a mixing device, in order to increase the mixing of the catalyst particles and sulfur so as to optimize the contacting therebetween. Examples of such devices are a vibratory belt, a rotary drum, a continuous mixer or a batch mixer.

It is possible to use, for example, a continuous mixer, fed simultaneously by the catalyst stream and the pre-metered solid sulfur stream. Such a mixer consists of a generally tubular device in which a helical kneader rotates.

Similarly, it is possible to use a rotary drum in which the solid compounds to be mixed are pre-metered and introduced simultaneously into the drum. The rotation of the latter ensures a homogeneous mixing of said solid compounds.

The use of such an additional mixing device is purely optional. Indeed, at the temperature at which the contacting step is carried out, the mixing between the sulfur and the catalyst particles circulating takes place very rapidly.

The temperature at which the first step is carried out may be controlled with the aid of thermocouples. It ranges from 120° C. to 160° C., and more preferentially from 130° C. to 150° C.

Such a temperature enables a rapid melting of the sulfur, and liquid sulfur to be obtained that has a moderate viscosity (typically, from 8 to 10 cP, i.e. 8 to 10 mPa·s) which enables it to penetrate into the pores of the catalyst.

The heat required for melting the sulfur is provided by the hot catalyst resulting from the reaction zone (B). The temperature at which this step is carried out must be regulated so as to remain within the ranges specified above. It essentially depends on the temperature and flow rate of the catalyst introduced into the zone (A), and also on the temperature and flow rate of sulfur feeding this same zone. When the temperature of the catalyst at the outlet of the reaction zone (B) is too high, a prior cooling of this catalyst may be carried out before the introduction thereof into zone (A), as described below.

Generally, the amount of sulfur introduced is metered by weighing before injection into the contacting zone (A). According to one advantageous embodiment, it is servo-controlled, without excess sulfur, by the hydrogen sulfide requirements. The weight ratio of the amount of sulfur introduced to the amount of catalyst circulating may be adjusted as a function of the exothermicity of the reaction, so that the temperature in the reaction zone does not exceed the desired maximum temperature.

The amount of sulfur used during step (a) preferably represents from 5% to 30% by weight of sulfur relative to the weight of catalyst, and preferably from 7% to 20% by weight of sulfur relative to the weight of catalyst.

Step (b) of the process of the invention consists in circulating the mixture of sulfur and catalyst resulting from step (a) in a reaction zone (B) or reactor, in which said mixture is brought into contact with hydrogen so as to carry out the conversion of the sulfur and hydrogen into hydrogen sulfide.

A distinctive feature of the process of the invention is that the conversion of the sulfur into hydrogen sulfide is carried out in a moving catalyst bed reactor, i.e. a reactor in which the mixture of catalyst and sulfur flows from the inlet to the outlet of the reactor.

Hydrogen is injected into this reaction zone. Preferably, the hydrogen ($H_2$) is injected at several successive points distributed over the length of the reactor.

The introduction of hydrogen at several successive points along the reactor provides in particular the following advantages:

it makes it possible to work locally in a stoichiometric excess of hydrogen in order to guarantee a maximum conversion of the hydrogen into hydrogen sulfide;

it makes it possible to locally lower the partial pressure of $H_2S$ and therefore to limit its inhibitory effect on the conversion of the sulfur into $H_2S$;

it makes it possible to spread the release of the heat of reaction over a longer zone, and to obtain a better control of the temperature in the reactor. Indeed, the reaction is highly exothermic, and it is important to precisely control the temperature inside the reactor so that this temperature does not locally exceed 400° C., and preferably does not locally exceed 300° C.

The controlled introduction of molecular hydrogen enables a very precise control of the reaction, which makes it possible to maintain the temperature at the outlet of the reactor at a value below 300° C. and preferably below 250° C., and therefore to enable the catalyst to arrive at the inlet of zone (A) at a temperature between 120° C. and 160° C.

The hydrogen is typically injected with a stoichiometry ranging from 1 to 10 mol of hydrogen ($H_2$) per mole of sulfur (S), preferably from 1 to 2 mol of hydrogen per mole of sulfur, and more preferentially still from 1 to 1.2 mol of hydrogen per mole of sulfur.

According to one particularly preferred embodiment, the hydrogen is injected with a stoichiometry strictly greater than 1 mol of hydrogen ($H_2$) per mole of sulfur, which makes it possible to limit the risk of formation of polysulfanes.

Inside the reactor, two streams flow, one solid and the other gaseous:

the solid stream consists of catalyst particles as a mixture with liquid sulfur present in particular in the pores of the catalyst. As the catalyst progresses through the reactor, the sulfur is converted into hydrogen sulfide and the pores of the catalyst become depleted of sulfur;

the gaseous stream contains hydrogen that has not reacted, and the hydrogen sulfide ($H_2S$) formed. The concentration of hydrogen sulfide in the gaseous mixture increases in the reactor, from the first hydrogen injection point to the gaseous effluent outlet point.

The reaction zone (B) may operate co-currently or countercurrently, depending on whether the solid stream containing the catalyst particles and the gaseous stream containing the hydrogen circulate respectively in the same direction, or in the opposite direction in the reactor.

The position of the gaseous effluent outlet point on the reactor defines the circulation direction of the gas/solid system.

If the gaseous effluent outlet point is close to the inlet point of the catalyst into the reaction zone (B), the circulation direction is said to be countercurrent.

If the gaseous effluent outlet point is close to the outlet point of the catalyst from the reaction zone (B), the circulation direction is said to be co-current.

According to one preferred embodiment of the invention, the reaction zone (B) operates countercurrently, that is to say that the solid stream containing the catalyst particles and the gaseous stream containing the hydrogen circulate in the opposite direction in the reactor.

The preferred circulation direction is countercurrent since it makes it possible to obtain a faster complete conversion of the sulfur into hydrogen sulfide. Indeed, in the high-temperature zones in which the rate of conversion is highest, the hydrogen concentration is highest and the hydrogen sulfide concentration is lowest, which is kinetically more favourable since the hydrogen sulfide produced is an inhibitor of its own synthesis reaction.

The co-current circulation direction may also be used within the context of the present invention. This embodiment is less preferred, since in this configuration, in the high-temperature zones suitable for the conversion of the sulfur to hydrogen sulfide, the hydrogen sulfide concentration is high, and the hydrogen concentration is low. Thus, due to its inhibitory effect, the hydrogen sulfide slows down the conversion of the sulfur to hydrogen sulfide. However, the reduction in the rate of conversion of the sulfur into hydrogen sulfide may be compensated for by an increase in the residence time in the hottest zone of the reactor.

Due to the exothermic nature of the reaction, the temperature increases progressively along the reactor, from the inlet point of the catalyst into the reactor to the outlet point of the catalyst from the reactor.

According to the present invention, the temperature at the inlet of the catalyst into the reaction zone is greater than or equal to 150° C. Preferably, this temperature is greater than or equal to 180° C., and even more preferentially greater than or equal to 200° C.

At the outlet of the catalyst from the reaction zone, the temperature is less than or equal to 300° C., preferably less than or equal to 250° C.

According to one preferred embodiment, during step (b) the temperature in the reactor is regulated so as to remain at a value between 200° C. and 300° C.

According to one particularly advantageous embodiment, the temperature increases along the reaction zone from a value of 200° C.±10° C. to a value of 290° C.±10° C.

The temperature inside the reactor may be determined in a manner known per se, with the aid of thermocouples.

The pressure inside the reactor is maintained at a value of less than 3 bar ($3\times10^5$ Pa), preferably less than 2 bar ($2\times10^5$ Pa), and more preferentially still less than 1.3 bar ($1.3\times10^5$ Pa).

The applicant has surprisingly observed that the process of the invention made it possible to obtain total conversion yields of the elemental sulfur, under these temperature and pressure conditions that are milder than those generally used in the prior art.

According to one particularly preferred embodiment, the reaction zone comprises a tubular reactor consisting of an ascending vibrating helical coil. Thus, in the reaction zone, the mixture of catalyst and sulfur rises up along a helical coil.

Such a reactor consists of a vibrating coil of substantially tubular shape that is wound helically around a vertical axis and that comprises at least two pitches.

The cross section of the coil is preferentially circular and in this case the coil is a tube. In general, the tube has a diameter of between 100 and 300 mm. It typically has a developed length that may range up to 400 m.

The height of the helical coil may range from 5 to 40 m, preferably from 10 to 20 m.

The rise angle of the coil may range from 1 degree to 10 degrees, preferably from 1 to 5 degrees, and more preferentially still from 1 to 4 degrees.

The reactor has a number of turns that preferably ranges from 15 to 60, more preferentially from 25 to 40.

Typically, the number of turns is such that it enables a circulation rate of the catalyst that may range from 250 to 6000 kWh, preferably from 750 to 3000 kg/h, with a gas hourly space velocity (GHSV) typically from 10 to 1000 preferably from 30 to 100 $h^{-1}$. The catalyst typically occupies from 5% to 80% of the volume of the turns, preferably from 10% to 50%.

Said coil is advantageously formed of a metal material. Preferably, the vibrating coil is formed of a tube made of metal, more preferentially made of steel.

It may be obtained for example by the shaping of a metal tube along a helix around a substantially vertical axis. According to one advantageous embodiment, a central shaft makes it possible to rigidify and support the helix formed by the coil. The coil may be electrically insulated from the central shaft by the fastening system.

According to one preferred embodiment, a transformer supplies the helical reactor at at least one pitch of the coil with low voltage current, lower than 50 V, which makes it possible to directly heat the metal mass of the tube by the Joule effect to the temperature required in the reactor.

In particular, one or more pitches of the coil are heated by the Joule effect to a temperature between 150° C. and 200° C., in particular in the bottom part of the reactor, in the inlet zone of the mixture of catalyst and sulfur. The direct consequence of the Joule effect is the generation of heat in the mass of the coil. It makes it possible to obtain a greater flexibility for the control of the temperature at the heart of the coil relative to an indirect heating by a heat transfer fluid.

The vibrations of the helical reactor may be produced by at least one system placed at any suitable level, for example at the base or at the top of the shaft or else positioned around the coil. Among the appropriate vibration systems, mention may be made of the following systems: unbalanced motors, electromagnetic vibrators (excited by a variable cycle, with creation of pulses) and unbalanced excitations. Preferably, the vibrations are produced by a table acting as support for the central shaft and actuated by two unbalanced motors.

As the catalyst rises in the reactor in the form of a helical coil, the heat generated by the reaction makes it possible to maintain the temperature of the reactor at the required level. At the same time, the tubular walls of the reactor provide a large exchange area which makes it possible to evenly discharge the heat along the reactor.

A substantial advantage provided by the use of a reactor in the form of a helical coil within the context of the present invention is that it offers a very great flexibility in the control of the parameters of the process. In particular it makes it possible to efficiently discharge the heat resulting from the reaction and/or it enables a heating of the reaction medium by the Joule effect. It is thus possible to carry out a very precise control of the reaction temperature all along the reactor, in order to maintain it at a level that makes it possible to obtain the desired degree of conversion of the elemental sulfur.

At their outlet from the reaction zone (B), the gaseous effluents are separated from the catalyst particles. These effluents essentially consist of hydrogen sulfide, and may also contain hydrogen in a minor amount.

In order to improve this separation, it is possible to use any known device that makes it possible to separate a gas and solid particles, for example one or more cyclones or else one or more electrostatic filters.

At the outlet of the reaction zone (B), the catalyst is then recycled to the zone (A), where it is brought into contact with sulfur in accordance with step (a) of the process.

The catalyst leaving the reaction zone (B) (i.e., at the end of step (b)) in general no longer contains sulfur. However, it is perfectly possible within the context of the present invention that sulfur remains as a mixture with the catalyst, in a greater or lesser amount depending on the degree of conversion achieved during step (b). In this case, the residual sulfur that has not reacted is simply recycled with the catalyst to step (a) of the process, then to the reaction zone (B) in order to be converted into hydrogen sulfide.

As was disclosed above, the process according to the invention involves the circulation of the catalyst in a loop between the various zones of the unit in which the various steps of the process are carried out. The circulation rate of the catalyst may typically range from 250 to 6000 kg/h, preferably from 500 to 3000 kg/h.

The process according to the invention may advantageously further comprise a step of eliminating the catalyst fines (or dust) capable of forming in the catalyst as this catalyst circulates.

This step may be carried out for example before the recycling of the catalyst to the step (a). It may be carried out by making the catalyst pass through one or more screening devices, such as for example vibrating or rotary screens.

According to one particularly advantageous embodiment of the invention, the catalyst from the reaction zone is cooled before being brought back into contact with sulfur during step (a).

Indeed, due to the highly exothermic nature of the hydrogen sulfide synthesis reaction, the heat transported by the catalyst may be too great to enable the direct reintroduction thereof into the contact zone (A), given that the temperature of this zone must not exceed 160° C.

The catalyst may be cooled for example by making the catalyst pass through a cooling device such as a heat exchanger. Such a device is located between the reaction zone (B) and the zone (A) for bringing the catalyst into contact with the sulfur.

According to one advantageous embodiment of the invention, the downstream portion of the reactor employed in step (b) may be used as a catalyst cooling zone. In the case of a reactor consisting of an ascending vibrating helical coil, this objective may be achieved by using the last turns as a cooling zone. The cooling may be passive, that is to say that the catalyst and the reaction mixture circulating in these turns are simply left to cool by not heating them, and by not thermally insulating them so as to enable the heat to dissipate through the tubular walls, and by not injecting hydrogen therein. It is also possible to further carry out, in the last turns of the reactor, an active cooling, by means of an appropriate device, for example by making a cooling fluid pass over the turns.

The process according to the invention may also comprise a step of purifying the gaseous effluents resulting from the separation step (c), in order to purify the hydrogen sulfide produced, and to remove therefrom the other compounds capable of being present, such as for example the residual sulfur.

A first possibility consists in making the gaseous effluents pass through a cooling device that enables the condensation of the impurities. Another possibility consists in making the gaseous effluents pass through one or more adsorbent devices such as for example a column containing alumina or another porous material.

The composition of the gaseous stream at the outlet of the reaction zone is advantageously measured in-line by known techniques such as gas chromatography or spectroscopy. Such an in-line determination of the composition of the effluents makes it possible to regulate, in real time, the streams for introducing sulfur and hydrogen at the various steps of the process.

FIG. 1 illustrates an embodiment of the process according to the invention, in which the reaction zone (B) operates co-currently.

This figure represents a hydrogen sulfide production unit, in which the catalyst circulates in a loop from a zone (A) for coming into contact with sulfur to a reaction zone (B), then to a zone (C) for separating the catalyst and the reaction effluents, before being recycled to zone (A).

Zone (A) consists of a chamber into which the catalyst particles are introduced via the duct 1, whilst the elemental sulfur is introduced via the duct 2. In the chamber (A) the temperature is maintained at a value lying between 120° C. and 160° C.

The residence time of the catalyst in the contacting zone (A) is typically from 1 to 20 minutes, preferably from 3 to 10 minutes.

The mixture of catalyst and molten sulfur leaving the chamber (A) is then transported by means of the duct 3, to the reaction zone (B). This zone consists of a tubular reactor consisting of an ascending vibrating helical coil, in which the mixture of catalyst and sulfur rises.

A makeup of fresh catalyst may be added at the inlet of the reactor (B), by means of the duct 5.

Hydrogen, conveyed by the duct 4, is injected into the bottom part of the reactor, via the lines 4a, 4b and 4c. In the embodiment illustrated in FIG. 1, this injection takes place at three points of the reactor (B). It should be noted that this embodiment is in no way limiting, it being possible for the injections of hydrogen to be carried out at one or more points of the reactor.

In the reactor (B), the temperature is controlled so as to retain an inlet temperature in the bottom part of greater than 150° C., and an outlet temperature in the top part of less than 300° C. The pressure is less than 3 bar.

In order to maintain the reaction temperature at a sufficient value, the upstream zone B1 of the reactor is heated by the Joule effect, by supplying it at one or more pitches of the coil with a low voltage electric current (not represented).

Optionally, in the downstream zone B2 of the reactor (B), the turns are not heated and there is no longer injection of hydrogen, so as to allow cooling of the catalyst and of the gaseous effluents to start.

The residence time of the catalyst in the reaction zone (B) is typically from 5 to 120 minutes, preferably from 10 to 40 minutes.

At the outlet of the reactor (B), the catalyst and the gaseous effluents are sent to a unit (C) for separating the catalyst and the gaseous effluents.

The catalyst particles are then sent via the duct 7 to an optional screening device 11, which makes it possible to eliminate from the process the catalyst fines (or dust) optionally present, which are discharged via the line 12. The catalyst is then recycled via the line 1 to the zone (A) for coming into contact with sulfur.

During their passage through the turns of the zone B2 which act as heat exchanger, then through the separator (C) and finally through the screen 11, the catalyst particles are gradually cooled to an appropriate temperature that enables the reintroduction thereof into the contact zone (A) in which the temperature must not exceed 160° C.

The gaseous effluents resulting from the separator (C) are then sent via the line 6 to an optional separation device 8, such as for example a solid cold trap, a filter or a cyclone.

The hydrogen sulfide thus produced is recovered by the line 9.

Optionally, an in-line analysis device 10 makes it possible to determine the amount of hydrogen sulfide produced, and to consequently adjust the respective amounts of hydrogen and sulfur introduced, as depicted by the dotted feedback lines 13 and 14.

Figure 2:
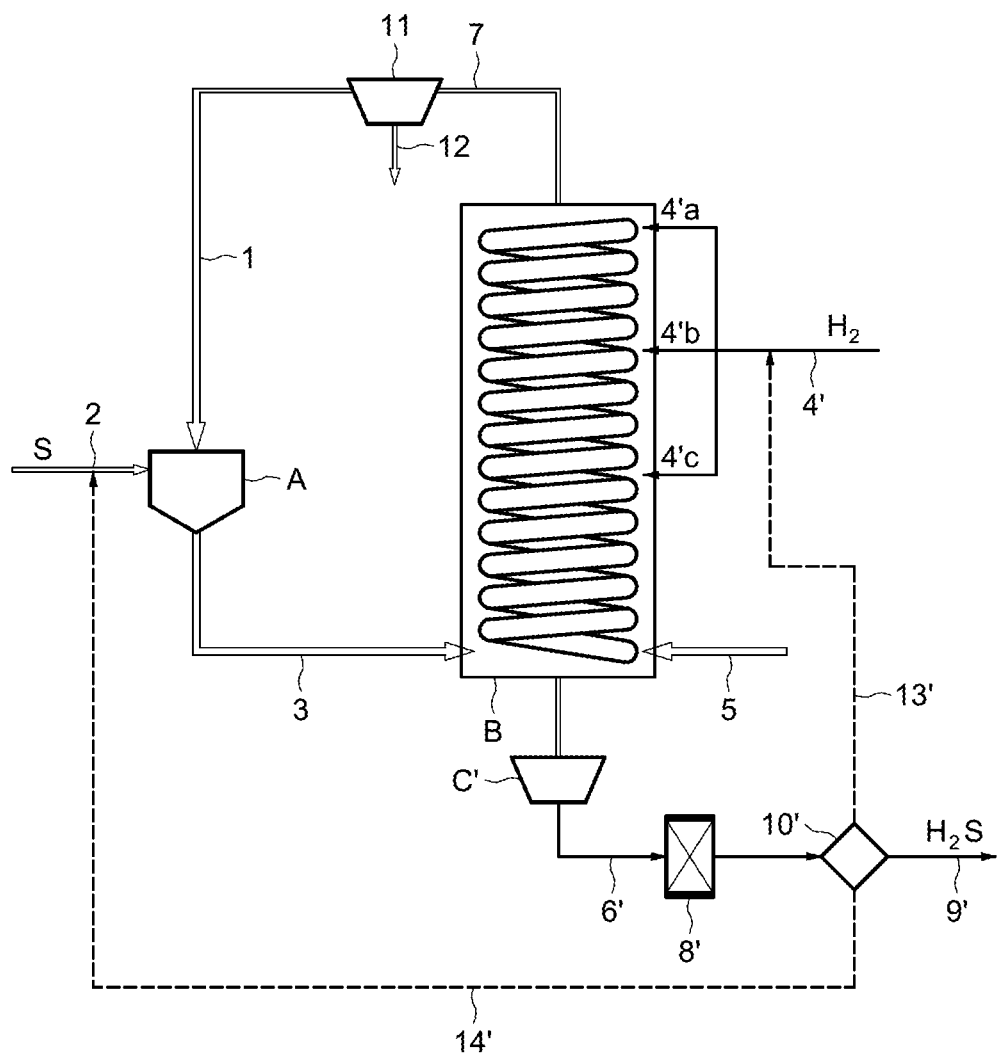
FIG. 2 illustrates a hydrogen sulfide production unit in accordance with the process of the invention, operating with a countercurrent circulation of catalyst and hydrogen.

FIG. 2 illustrates a preferred embodiment of the process according to the invention, in which the reaction zone (B) operates countercurrently.

This figure represents a hydrogen sulfide production unit in which the catalyst circulates in a loop from a zone (A) for coming into contact with sulfur, to a reaction zone (B).

The description of this process is the same as for FIG. 1, the references denoting the same elements.

The differences are the following:

Hydrogen, conveyed by the duct 4', is injected into the top part of the reactor, via the lines 4'a, 4'b and 4'c.

The separation of the catalyst and of the reaction effluents is carried out in the bottom part of the reactor, in the separation zone (C'). The hydrogen sulfide is recovered via the line 6' and discharged by the line 9'.

The optional devices for purification 8', for analysis 10' and for feedback of the amounts of hydrogen 13' and of sulfur 14' are identical to the corresponding devices 8, 10, 13 and 14 described for FIG. 1.

The invention claimed is:

1. A process for producing hydrogen sulfide from hydrogen and elemental sulfur, comprising the following steps:

(a) bringing the sulfur into contact with a solid catalyst comprising at least one metal, in metal sulfide form, chosen from metals from groups VIB and VIII of the Periodic Table of the Elements at a temperature ranging from 120° C. to 160° C.;

(b) circulating the mixture of sulfur and catalyst resulting from step (a) in a reaction zone, in which said mixture is brought into contact with hydrogen, the reaction zone having a temperature at the inlet point of the catalyst of greater than or equal to 150° C. and a temperature at the outlet point of the catalyst of less than or equal to 300° C., and a pressure of less than or equal to 3×105 Pa;

(c) separating the catalyst and the gaseous effluents containing hydrogen sulfide; and (d) recycling the catalyst to step (a).

2. The process according to claim 1, characterized in that the temperature at which step (a) is performed ranges from 130° C. to 150° C.

3. The process according to claim 1, characterized in that the amount of sulfur used during step (a) represents from 5% to 30% by weight of sulfur relative to the weight of catalyst.

4. The process according to claim 1, characterized in that during step (b) the hydrogen is injected at several points distributed over the length of the reactor.

5. The process according to claim 1, characterized in that the hydrogen is injected with a stoichiometry ranging from 1 to 10 mol of hydrogen ($H_2$) per mole of sulfur (S).

6. The process according to claim 1, characterized in that the temperature at the inlet of the catalyst into the reaction zone is greater than or equal to 180° C.

7. The process according to claim 1, characterized in that the temperature at the outlet of the catalyst from the reaction zone is less than or equal to 250° C.

8. The process according to claim 1, characterized in that the temperature increases along the reaction zone from a value of 200° C.±10° C. to a value of 290° C.±10° C.

9. The process according to claim 1, characterized in that the pressure inside the reactor is less than $2\times10^5$ Pa.

10. The process according to claim 1, characterized in that the reaction zone comprises a tubular reactor consisting of an ascending vibrating helical coil.

11. The process according to claim 10, characterized in that one or more pitches of the coil of the reactor are heated by the Joule effect.

12. The process according to claim 1, characterized in that the catalyst resulting from the reaction zone is cooled before being brought back into contact with sulfur during step (a).

13. The process according to claim 12, characterized in that the downstream portion of the reactor employed in step (b) is used as a catalyst cooling zone.

14. The process according to claim 1, characterized in that the catalyst comprises metal(s) from groups VIB and VIII of the Periodic Table of the Elements, in the form of metal sulfides, deposited on a support based on one or more refractory mineral oxides.

15. The process according to claim 1, characterized in that the reaction zone operates co-currently, the solid stream containing the catalyst particles and the gaseous stream containing the hydrogen circulating in the same direction in the reactor.

16. The process according to claim 1, characterized in that the reaction zone operates countercurrently, the solid stream containing the catalyst particles and the gaseous stream containing the hydrogen circulating in the opposite direction in the reactor.

* * * * *

UNITED STATES PATENT AND TRADEMARK OFFICE
CERTIFICATE OF CORRECTION

PATENT NO. : 10,737,939 B2
APPLICATION NO. : 15/963088
DATED : August 11, 2020
INVENTOR(S) : Dufresne et al.

Page 1 of 1

It is certified that error appears in the above-identified patent and that said Letters Patent is hereby corrected as shown below:

In the Specification

Column 6, Line 39, delete "6000 kWh" and insert --6000 kg/h--.

Signed and Sealed this
Eighth Day of December, 2020

Andrei Iancu
*Director of the United States Patent and Trademark Office*